United States Patent [19]

Vial et al.

[11] 4,089,822

[45] May 16, 1978

[54] NOVEL POLYURETHANE CURATIVE

[75] Inventors: Theodore Merriam Vial, Princeton; Nicholas Peter Ermidis, West New York, both of N.J.

[73] Assignee: American Cyanamid Company, Stamford, Conn.

[21] Appl. No.: 683,563

[22] Filed: May 5, 1976

Related U.S. Application Data

[63] Continuation-in-part of Ser. No. 567,571, Apr. 4, 1975, abandoned, which is a continuation of Ser. No. 441,715, Feb. 11, 1974, abandoned, which is a continuation of Ser. No. 364,766, May 29, 1973, abandoned, which is a continuation-in-part of Ser. No. 276,494, Jul. 31, 1972, abandoned, which is a continuation-in-part of Ser. No. 163,082, Jul. 15, 1971, abandoned.

[51] Int. Cl.² ............................................. C08G 18/22
[52] U.S. Cl. .......................... 260/18 TN; 260/22 TN; 260/31.2 N; 260/31.8 G; 260/31.8 R; 260/33.2 R; 260/75 NH; 260/75 NQ; 260/77.5 AM; 260/77.5 AQ; 260/75 NC; 260/77.5 AC
[58] Field of Search ....... 260/18 TN, 22 TN, 75 NH, 260/75 NQ, 77.5 AM, 77.5 AQ, 33.2 R, 31.2 N, 31.8 R, 31.8 G, 77.5 AC, 75 NC

[56] References Cited

U.S. PATENT DOCUMENTS

| Re. 28,541 | 10/1975 | Ryan | 260/18 TN |
|---|---|---|---|
| 2,939,851 | 6/1960 | Orchin | 260/77.5 AC |
| 3,462,470 | 8/1969 | Emery et al. | 260/77.5 AC |
| 3,580,875 | 5/1971 | Bianca | 260/18 TN |
| 3,629,168 | 12/1971 | Ryan | 260/75 NC |
| 3,660,326 | 5/1972 | Mallabar | 260/18 TN |
| 3,681,291 | 8/1972 | Khan | 260/19 |
| 3,880,809 | 4/1975 | Finelli | 260/75 NH |

FOREIGN PATENT DOCUMENTS 2,234,727   1/1973   Germany.

Primary Examiner—Eugene C. Rzucidlo
Attorney, Agent, or Firm—Frank M. Van Riet

[57] ABSTRACT

A polyurethane elastomer exhibiting a low glass transition temperature is provided, which comprises the reaction product of (a) a polyurethane prepolymer having terminally reactive isocyanate groups, prepared by reaction of a polymeric diol with a stoichiometric excess of 2,4-tolylene diisocyanate, 2,6-tolylene diisocyanate or a mixture of tolylene diisocyanates containing a major proportion of the 2,4-isomer, with (b) from 80 to 110% of the stoichiometrically required amount of 2,6-dichloro-p-phenylene diamine, and (c) from about 0.01 to 1 part per hundred of prepolymer of a conventional polyurethane catalyst.

14 Claims, No Drawings

NOVEL POLYURETHANE CURATIVE

CROSS REFERENCE TO RELATED APPLICATIONS

This is a continuation-in-part of application Ser. No. 567,571, filed April 14, 1975, now abandoned which is a continuation of Ser. No. 441,715, filed Feb. 11, 1974, now abandoned which is a continuation of Ser. No. 364,766, filed May 29, 1973, now abandoned, which is a continuation-in-part of Ser. No. 276,494, filed July 31, 1972, now abandoned, which is a continuation-in-part of Ser. No. 163,082, filed July 15, 1971, now abandoned.

Generally stated, the subject matter of the present invention relates to a curative system for polyurethane prepolymers. More diamine the invention relates to a diamine curative system for polyurethane prepolymers containing terminal isocyanate groups.

BACKGROUND OF THE INVENTION

The polyurethane prepolymers, which are obtained by reacting an excess of tolylene diisocyanate with a polymeric diol, are commonly employed to prepare cast polyurethane elastomers when cured or chain-extended with organic aromatic diamines. The more commonly employed diamine is 4,4'-methylenebis(o-chloroaniline) which, when employed to cure prepolymers prepared from tolylene isocyanate, provides elastomers having excellent physical properties. However, the possible implication of this diamine as being carcinogenic has made it desirable to find a substitute which imparts equal or better physical properties and which is inexpensive and readily available.

The present invention represents the culmination of a long series of investigations undertaken to find an inexpensive, readily available substitute.

It is well recognized in the art that 2,4-tolylene diisocyanate contains 2 unequally reactive isocyanate groups and that prepolymers prepared from a major proportion of this isomer have terminally hindered isocyanate groups. These prepolymers are generally chain-extended with diamines which have 2 equally reactive amino groups, since it is important that the rate of the chain-extending reaction be reasonably fast. A diamine having 2 unequally reactive amino groups has a generally slower rate of reaction. Therefore, 4,4'-methylenebis(o-chloroaniline) has been the preferred curing agent.

Accordingly, it is a primary object of this invention to provide an inexpensive, readily available substitute for 4,4'-methylenebis(o-chloroaniline).

Another object of the invention is to provide a new and improved diamine curative system for polyurethane prepolymers.

It is still another object of this invention to provide a polyurethane elastomer with improved low temperature properties, that is having a low glass transition temperature.

Lastly, it is an object of the invention to provide an improved process for chain-extending polyurethane prepolymers haveing terminal isocyanate groups.

Additional objects and advantages will be set forth in part in the description which follows, and in part will be obvious from the description or may be learned by the practice of the invention, the objects and advantages being realized and attained by means of compositions and improvements, particularly pointed out in the appended claims.

THE INVENTION

To achieve the foregoing objects and in accordance with its purposes as embodied and broadly described, the present invention provides a diamine curative system for polyurethane prepolymers having terminal isocyanate groups which comprises 2,6-dichloro-p-phenylene diamine (DCP) and a catalyst to increase the rate of reaction of said diamine with the prepolymer.

In addition, the invention also relates to an improved polyurethane elastomer prepared by such a curative system.

The invention consists of the novel compositions, methods, processes, steps and improvements herein shown and described.

It is to be understood that both the foregoing general description and the following detailed description are exemplary and explanatory and are not restrictive of the invention.

The present invention provides a diamine curative system which provides elastomers having overall higher hardness, increased tensile strength, a higher modulus, a greatly improved tear strength, and a surprisingly low glass transition temperature (Tg).

Although, for clarity of description, the invention can be described with reference to its preferred embodiment, it should be understood that the principles of the invention are applicable to the broad description of the invention hereinabove set forth.

The compound 2,6-dichloro-p-phenylene diamine is a known curative for polyurethane prepolymers. However, it has not been a good curative for prepolymers made from 2,4-tolylene diisocyanate because its rate of reaction is too slow. Additionally, the physically properties of the elastomer so prepared, even when fully cured, are mediocre at best.

Applicants' invention primarily resides in the discovery that when 2,6-dichloro-p-phenylene diamine is combined with minor amounts of a conventional polyurethane catalyst, not only is the reaction rate faster, but unexpectedly superior physical properties are obtained when it is used as a chain-extending agent for polyurethane prepolymers made from 2,4-tolylene diisocyanate or isomeric mixtures containing a major proportion of 2,4-tolylene diisocyanate.

An aspect of the present invention which is completely unexpected and surprising is the unusually low glass transition temperature (Tg) which the resulting polyurethane elastomers exhibit when cured with DCP. The glass transition temperature is that temperature of which an elastomer changes from a rubbery to a brittle state. Practically, low Tg is desirable because it extends the useful properties of the elastomer to low temperature, and parts fabricated from the elastomer can be used in applications where low temperature rubbery properties are important.

In accordance with the present invention, the curative system is most useful with polyurethane prepolymers prepared by the well known reaction of a stoichiometric excess of 2,4-tolylene diisocyanate, 2,6-tolylene diisocyanate or mixtures of 2,4- and 2,6-tolylene diisocyanate, in which the 2,4-isomer constitutes a major proportion of the mixture, with a polymeric diol. Such reaction products, as is well known, contain terminally reactive isocyanate groups, and are generally referred to in the art as prepolymers.

Useful polymeric diols include, as is well known in the polyurethane art, polyesters, polyesteramides, polyethers, polyacetals and the like. These polyols contain terminal hydroxyl groups and have molecular weights in the range of about 500 to 5,000 preferably about 500 to 3000.

In most cases the prepolymers are chain-extended with from about 80% to 110% of the stoichiometrically required amount of 2,6-dichloro-p-phenylene diamine. In some cases, it may be desirable to use slightly more than the stoichiometric amount.

Since at normal curing temperatures DCP reacts with the prepolymer slowly, a conventional polyurethane catalyst is used to speed the reaction and to aid in development of the optimum extent of cure. Catalysts useful in increasing the rate of reaction of DCP include mono- and dicarboxylic acids and their metal salts, such as glutaric acid, pimelic acid, azeleic acid, propionic acid, valeric acid, caproic acid, caprylic acid, myristic acid, palmitic acid, stearic acid, stannous stearate, stannous octoate, chromium naphthenate, molybdenum naphthenate and the like. Also useful are tertiary amines, such as triethylene diamine, dimethyl oleylamine, triethylene diamine, n-ethylmorpholine, and the like; and anhydrides of carboxylic acids, such as stearic anhydride, phthalic anhydride, and the like. The catalyst preferably should either be soluble in the polymer composition or compatible therewith at curing temperatures. The preferred catalysts for the reaction because of ready availability and low cost, are the mono- and dicarboxylic acids. They are normally used in an amount of from about 0.01% to about 1% by weight, preferably about 0.05% to 0.5% by weight.

Since the chain-extension reaction between the prepolymer and the diamine is normally conducted at a temperature of about 90 to 110° C. and since 2,6-dichloro-p-phenylene diamine has a melting point of 122° C., the presence of 2,6-dichloro-p-phenylene diamine crystals is oftentimes encountered in the mixture. This problem is effectively eliminated by the addition to the composition of from about 1% to 10%, based on the weight of prepolymer, of a solubilizing agent, eg. dimethyl ether of tetraethylene glycol or tricresyl phosphate. An effective alternative is the use of lower melting eutectic mixtures of DCP and other diamines.

The following examples are provided for illustrative purposes and may include particular features of the invention. However, the examples should not be construed as limiting the invention, many variations of which are possible without departing from the spirit or scope thereof.

EXAMPLE I

A polyester-based polyurethane prepolymer, prepared using an 80:20-isomeric mixture of 2,4- and 2,6-tolylene diisocyanate, and having an isocyanate content of 3.2%, was chain-extended with 95% of the stoichiometrically required amount of 2,6-dichloro-p-phenylene diamine as shown in the accompanying Table 1. Compositions were cured in the mold for 30 minutes at 100° C. and post cured for 16 hours at 100° C. in a forced air oven.

TABLE 1

|  | A | B | C |
|---|---|---|---|
| Polyurethane Prepolymer | 100 | 100 | 100 |
| 2,6-dichloro-p-phenylene diamine | 6.41 | 6.41 | 6.41 |
| Azelaic Acid | — | 0.3 | — |
| Pimelic Acid | — | — | 0.2 |
| Dimethyl ether of Tetraethylene glycol | 2.0 | 2.0 | 2.0 |

TABLE 1-continued

|  | A | B | C |
|---|---|---|---|
| Pot Life, min. at 100° C. | 28 | 4 | 4 |
| Gel Time, min. at 100° C. | 31 | 5 | 5½ |
| Shore A Hardness | 76 | 90 | 90 |
| Tensile, psi | 4375 | 8455 | 7450 |
| Elongation, % | 715 | 765 | 690 |
| Modulus at 100%, psi | 400 | 925 | 900 |
| at 300%, psi | 625 | 1450 | 1425 |
| Tear, Die C, PLI (lbs./linear inch) | 350 | 652 | 636 |
| Tear, Split, PLI | 178 | 530 | 510 |

The above data show that 2,6-dichloro-p-phenylene diamine in combination with a dicharboxylic acid catalyst provides a cured polyurethane exhibiting excellent physical properties, whereas in the absence of the catalyst, 2,6-dichloro-p-phenylene diamine is slow and gives inferior properties.

EXAMPLE II

In an experiment similar to Example I, 100 parts of a similar prepolymer having an isocyanate content of 3.1% was chain-extended with 6.2 parts of 2,6-dichloro-p-phenylene diamine 2.0 parts of dimethyl ether of tetraethylene glycol and 0.3 parts stearic acid. Properties are shown in Table 2. The composition was cured in the same manner as Example I.

TABLE 2

| Pot Life, min. | 8 |
|---|---|
| Gel Time, min. | 10 |
| Shore A hardness | 85 |
| Tensile, psi | 8200 |
| Elongation, % | 745 |
| Modulus at 100%, psi | 825 |
| at 300%, psi | 1375 |
| Tear, Die C, PLI (lbs./lin. in.) | 577 |
| Tear, Split, PLI | 452 |

The above data illustrates the use of a monocarboxylic acid catalyst in combination with 2,6-dichloro-p-phenylenylene diamine.

EXAMPLE III

A polyurethane prepolymer (100 parts) prepared from an 80:20 mixture of 2,4- and 2,6-tolylene diisocyanate, having an NCO content of 3.1%, was chain-extended with a) 2,6-dichloro-p-phenylene diamine and b) methylenebis (o-chloroaniline) using 95% of the stoichiometrically required amounts. The compositions were cured for 30 minutes at 100° C. followed by 16 hours postcure at 100° C.

|  | Parts by Weight | |
|---|---|---|
|  | A | B |
| Prepolymer | 100 | 100 |
| 2,6 - DCP | 6.21 | — |
| MOCA | — | 9.33 |
| Azelaic acid | 0.2 | — |
| Tricresylphosphate | 4.0 | 4.0 |
| Pot Life, min. at 100° C. | 5 | 13½ |
| Gel Time, min. at 100° C. | 6½ | 15½ |
| PROPERTIES | | |
| Shore A hardness | 85 | 82 |
| Tensile, psi | 5425 | 5600 |
| Elongation, % | 740 | 770 |
| Modulus at 100%, psi | 750 | 500 |
| at 300%, psi | 1200 | 800 |
| Split tear, pli | 520 | 288 |
| Die C Tear, pli | 617 | 488 |

Elastomer samples A and B were subjected to dynamic mechanical analysis using a Vibron Dynamic Viscoelastometer (Toyo Measuring Instrument Co. Ltd., Tokyo, Japan). Molded samples about 20 mils thick, 1/8 inch wide and an appropriate length are inserted into the apparatus, a Sinusoidal tensile strain is applied to one end of the sample and the phase angle δ of the strain against stress generated at the other end. Dynamic modulus can be calculated from tan δ, read directly from the instrument, and from the amplitude of stress and strain. The complex elastic modulus /E/ in dynes/cm² is calculated using the formula:

$$|E| = 2.0 \times 10^9 \left( \frac{L}{w \times t \times D \times A} \right)$$

Where L is the length of the sample, $w$ the width, $t$ the thickness; D is the value of the dynamic force dial when measuring tan δ, and A is a constant for the instrument. From /E/ the values $E^1$ and $E^{11}$ can be calculated. $E^1$ is the elastic modulus and $E^{11}$ the unelastic or "loss" modulus. Plots of both $E^1$ and $E^{11}$ are made automatically when measurements are made at one or two frequencies (cycles per second) over a range of temperature of about −100° C. to 220° C. The maximum of the loss modulus curve ($E^{11}$ max,) is very close to the glass transition temperature, Tg ° C. at very low frequencies, 1-3 $H_r$.

When calculated from the loss modulus, compositions A and B gave Tg, ° C. ($E^{11}$ max.) of −29° C. and −23° C., respectively. This represents a significant and unexpected decrease in Tg.

EXAMPLE IV

In this experiment to each 100 parts of a polyurethane prepolymer having an NCO content of 3.1% was added 6.2 parts (95% of stoichiometric amount) of 2,6-dichloro-p-phenylene diamine and 4 parts of tricresyl phosphate. Several different catalysts were evaluated for effectiveness in promoting the curing reaction and were used in the amounts shown below. For comparison a sample of the polymer was cured uncatalyzed with an equivalent amount of methylenebis (o-chloroaniline). All compositions were cured in a mold for 30 minutes at 100° C., followed by a post-cure of 16 hours at 100° C.

|  | % Catalyst | | | | MOCA Cure |
|---|---|---|---|---|---|
|  | A | B | C | D | E |
| Stannous octoate | 0.5 | — | — | — | — |
| Molybdenum naphthenate | — | 0.9 | — | — | — |
| Triethylene diamine | — | — | 0.4 | — | — |
| Stearic anhydride | — | — | — | 0.5 | — |
| Properties |  |  |  |  |  |
| Pot life, min at 100° C. | 7 | 4 | 2½ | 7 | 11 |
| Gel time, min at 100° C. | 8 | 5 | 3½ | 9 | 14 |
| Shore A hardness | 85 | 85 | 80 | 85 | 80 |
| Tensile, psi | 6400 | 5350 | 5000 | 7050 | 7600 |
| Elongation, % | 750 | 770 | 750 | 770 | 690 |
| 300% modulus, psi | 1195 | 1090 | 1000 | 1150 | 1140 |
| Split tear, plo | 575 | 550 | 535 | 570 | 375 |

The data show the effect of various catalysts in promoting the cure reaction of DCP (pot life and gel time faster than with MOCA), in developing a high state of cure and in improving the tear strength of the polymer.

EXAMPLE V

A polyurethane prepolymer (100 part) prepared from a 80:20 mixture of 2,4- and 2,6-tolylene diisocyanate was mixed with 4 parts of tricresyl phosphate and 6.61 parts of 2,6-dichloro-p-phenylene diamine (95 percent of the stoichiometric amount required). This was designated A. A second portion, designated B, was prepared with the addition of 0.05 part of azelaic acid as catalyst. Both compositions were then cured for 60 minutes at 100° C. and post cured for 16 hours at 100° C. Data are shown in the table below:

|  | A | B |
|---|---|---|
| pot life at 100° C, min | 37 | 19 |
| gel time at 100° C, min | 41 | 21 |
| tensile, psi | 3,825 | 6,150 |
| elongation, percent | 810 | 700 |
| modulus at 100 percent, psi | 425 | 575 |
| modulus at 300 percent, psi | 700 | 1,025 |
| Shore A hardness | 79 | 83 |

The data shown illustrate the effectiveness of 0.05 part of azelaic acid in developing superior physical properties.

EXAMPLE VI

100 Parts of a polyester-based prepolymer, prepared from polyethyleneadipate and tolylene diisocyanate, having an isocyanate content of 3.1% was mixed with 4.0 parts of tricresylphosphate, 5.9 parts (90% of the stoichiometric amount) of 2,6-dichloro-p-phenylene diamine, and the stated amount of carboxylic acid shown in Table I. The compositions were mixed at 100° C, poured into a mold and cured for 1 hour at 100° C, followed by 16 hours post-conditioning at 100° C. The resulting test specimens were tested for properties as shown in Table II.

Table 6

| Carboxylic Acid | Parts by Weight | | | | | |
|---|---|---|---|---|---|---|
|  | A | B | C | D | E | F |
| Benzoic | 0.3 |  |  |  |  |  |
| Stearic |  | 0.5 |  |  |  |  |
| Bytyric |  |  | 0.5 |  |  |  |
| Azelaic |  |  |  | 0.3 |  |  |
| Pimelic |  |  |  |  | 0.3 |  |
| Succinic |  |  |  |  |  | 0.3 |
|  | A | B | C | D | E | F | Control |
| Pot life, min. | 3.0 | 6.0 | 3.0 | 3.5 | 5.0 | 7.0 | 32.0 |
| Gel time, min. | 3.5 | 6.5 | 3.5 | 4.0 | 5.5 | 8.5 | 34.0 |

Table 7

|  | Physical Properties | | | | | | |
|---|---|---|---|---|---|---|---|
|  | A | B | C | D | E | F | Control |
| Hardness, Shore A | 85 | 86 | 86 | 86 | 86 | 84 | 77 |
| Tensile, psi | 8332 | 7708 | 6404 | 8060 | 8184 | 5829 | 5889 |
| Elongation, % | 825 | 937 | 1024 | 916 | 916 | 935 | 1013 |
| Modulus, 100%, psi | 720 | 707 | 684 | 740 | 747 | 594 | 363 |
| 300%, psi | 1328 | 1228 | 1213 | 1319 | 1360 | 1047 | 752 |

EXAMPLE VII

Following the procedure of Example VI, except for the omission of tricresylphosphate, the metal salts shown in Table 8 were evaluated in combination with 2,6-dichloro-p-phenylene diamine.

Table 8

| Metal Salt | A | B | C | Control |
|---|---|---|---|---|
| Stannous octoate | 0.5 | | | |
| Molybdenum naphthenate | | 0.5 | | |
| Zinc benzoate | | | 0.5 | |
| Pot life, min. | 12.5 | 8.0 | 11.0 | 34.0 |
| Gel time, min. | 13.0 | 9.0 | 12.0 | 35.0 |

Physical properties are shown in Table IV.

Table 9

| | Physical Properties | | | |
|---|---|---|---|---|
| | A | B | C | Control |
| Hardness, Shore A | 84 | 85 | 80 | 79 |
| Tensile, psi | 7244 | 7382 | 6614 | 5774 |
| Elongation, % | 797 | 793 | 831 | 578 |
| Modulus, 100% psi | 581 | 597 | 582 | 395 |
| 300%, psi | 1046 | 1061 | 958 | 732 |

EXAMPLE VIII

Following the procedure of Example VI, the carboxylic acid anhydrides shown in Table 10 were evaluated in combination with 2,6-dichloro-p-phenylene diamine.

Table 10

| | Parts by Weight | | | | | |
|---|---|---|---|---|---|---|
| | A | B | C | D | E | Control |
| Stearic anhydride | 0.5 | | | | | |
| Acetic anhydride | | 0.5 | | | | |
| n-Butyric anhydride | | | 0.5 | | | |
| Maleic anhydride | | | | 0.5 | | |
| Glutaric anhydride | | | | | 0.5 | |
| Pot life, min. | 15 | 11.5 | 5.5 | 4 | 6 | 37.5 |
| Gel time, min. | 16 | 12 | 6.5 | 5 | 7 | 39.5 |

Physical properties are shown in Table VI

Table 11

| | Physical Properties | | | | | |
|---|---|---|---|---|---|---|
| | A | B | C | D | E | Control |
| Hardness, Shore A | 82 | 80 | 80 | 85 | 80 | 75 |
| Tensile, psi | 7104 | 6567 | 6237 | 7349 | 6852 | 5401 |
| Elongation, % | 771 | 996 | 995 | 1000+ | 885 | 1039 |
| Modulus, 100%, psi | 690 | 517 | 472 | 677 | 580 | 400 |
| 300%, psi | 1135 | 905 | 793 | 1045 | 1175 | 713 |

The data in Tables 6, 8, and 10 show the effectiveness of the various carboxylic acids, metal salts and carboxylic acid anhydrides in catalyzing the reaction of the prepolymers and the 2,6-dichloro-p-phenylene diamine curative, and that Tables 7, 9, and 11 illustrate the general unexpected improvement in physical properties of the curative system of the above-identified application as compared with 2,6-dichloro-p-phenylene diamine alone.

EXAMPLE IX

An additional polymer was made as follows:

| | Parts by Weight (grams) |
|---|---|
| Polyurethane Prepolymer* | 100 |
| 2,6-Dibromo-p-phenylenediamine | 9.11 |
| Tricresylphosphate | 4.0 |
| Azelaic acid | 0.3 |

*Prepolymer from polyethyleneadipate and tolylenediisocyanate; NCO content 3.2%

The prepolymer, 2,6-dibromo-p-phenylene diamine (90% of stoichiometrically required amount), tricresyl phosphate and azelaic acid were mixed at 100° C., poured into a mold and cured for 1 hour at 100° C., followed by 16 hours post conditioning at 100° C. Properties were obtained as shown in Table 12.

Table 12

| Pot life, min. | 7 |
|---|---|
| Gel time, min. | 8 |
| Hardness, Shore A | 85 |
| Tensile, psi | 7972 |
| Modulus, psi | |
| at 100% | 692 |
| at 300% | 1500 |
| Elongation, % | 619 |

We claim:

1. A polyurethane elastomer comprising the reaction product of (a) a polyurethane prepolymer having terminally reactive isocyanate groups, prepared by reaction of a polymeric diol with a stoichiometric excess of 2,4-tolylene diisocyanate, 2,6-tolylene diisocyanate or a mixture of tolylene diisocyanates containing a major proportion of the 2,4-isomer, with (b) from 80 to 110% of the stoichiometrically required amount of 2,6-dichloro-p-phenylene diamine, or 2,6-dibromo-p-phenylene diamine in the presence of from about 0.01 to 1 part per hundred of prepolymer of a catalyst selected from the group consisting of mono and dicarboxylic acids, metal salts of mono and dicarboxylic acids, carboxylic acid anhydrides, and tertiary amines.

2. An elastomer according to claim 1 wherein the catalyst is stearic acid.

3. An elastomer according to claim 1 wherein the catalyst is azaleic acid.

4. An elastomer according to claim 1 wherein the catalyst is stannous octoate.

5. An elastomer according to claim 1 wherein the catalyst is triethylene diamine.

6. An elastomer according to claim 1 wherein there is additionally added from about 1% to 10% of a solubilizing agent.

7. An elastomer according to claim 6 wherein the solubilizing agent is the dimethyl ether of tetraethylene glycol.

8. A diamine curative system for polyurethane prepolymers having terminally reactive isocyanate groups, prepared by reaction of a polymeric diol with a stoichiometric excess of 2,4-tolylene diisocyanate, 2,6-tolylene diisocyanate or a mixture of tolylene diisocyanates containing a major proportion of the 2,4-isomer consisting essentially of from about 80 to 110% of the stoichiometrically required amount of 2,6-dichloro-p-phenylene diamine, 2,6-dibromo-p-phenylene diamine and from about 0.01 to 1 part per hundred of prepolymer of a catalyst selected from the group consisting of mono and dicarboxylic acids, metal salts of mono and dicarboxylic acids, carboxylic acid anhydrides, and tertiary amines.

9. A curative system according to claim 8 wherein the catalyst is stearic acid.

10. A curative system according to claim 8 wherein the catalyst is azaleic acid.

11. A curative system according to claim 8 wherein the catalyst is stannous octoate.

12. A curative system according to claim 8 wherein the catalyst is triethylene diamine.

13. A curative system according to claim 8 wherein there is additionally added from about 1% to 10% of a solubilizing agent.

14. A curative system according to claim 13 wherein the solubilizing agent is the dimethyl ether of tetraethylene glycol.

* * * * *